UNITED STATES PATENT OFFICE.

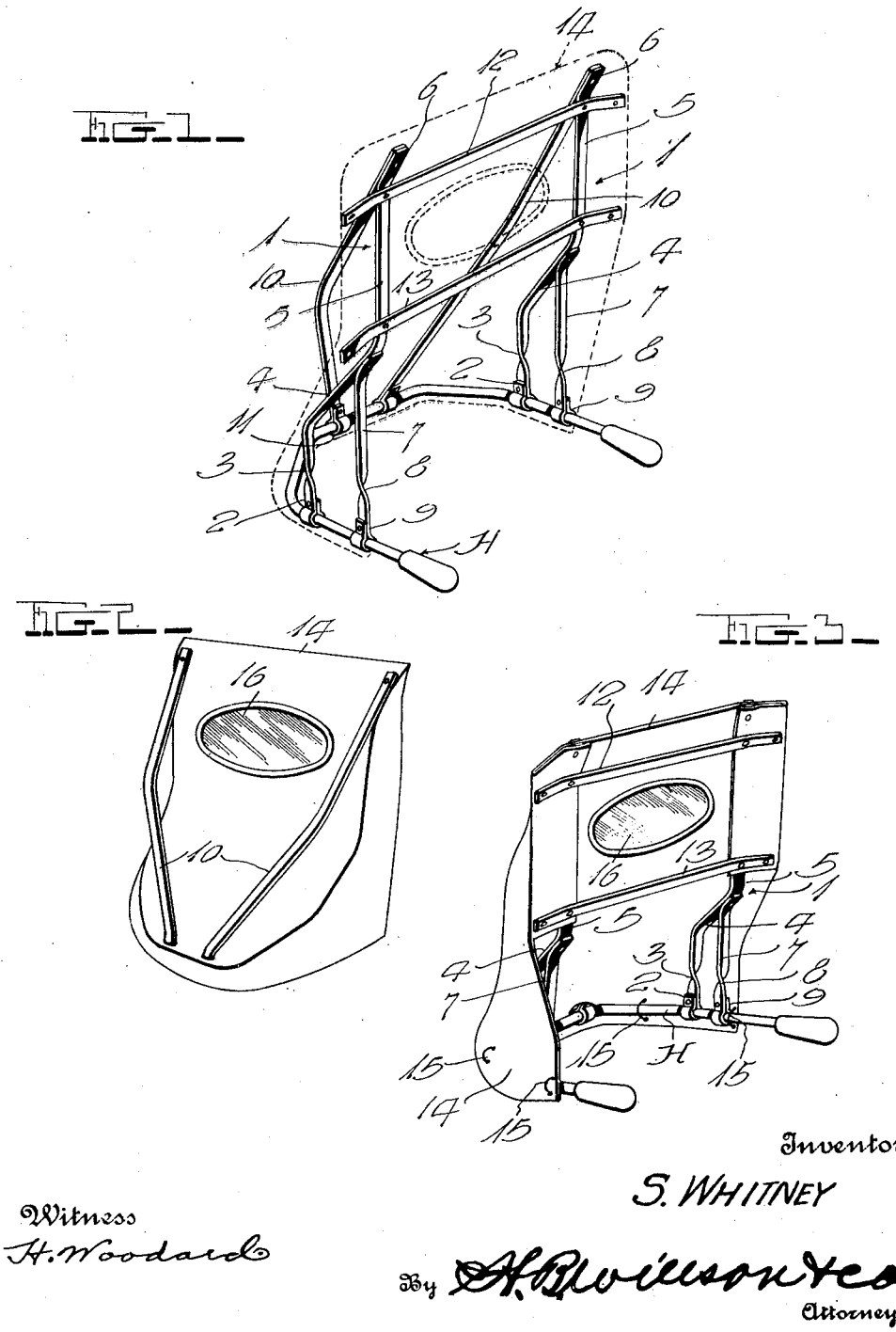

SAMUEL WHITNEY, OF CALGARY, ALBERTA, CANADA.

WINDSHIELD FOR MOTORCYCLES.

1,369,585.  Specification of Letters Patent.  Patented Feb. 22, 1921.

Application filed June 28, 1920. Serial No. 392,247.

*To all whom it may concern:*

Be it known that I, SAMUEL WHITNEY, a citizen of Canada, residing at Calgary, Alberta, Dominion of Canada, have invented certain new and useful Improvements in Windshields for Motorcycles; and I do declare the following to be a full, clear, and exact description of the invention, such as will enable others skilled in the art to which it appertains to make and use the same.

This invention relates to windshields which are especially designed for use upon motor cycles or the like.

The principal object of the invention is to provide a windshield which can be attached to the handle-bar of a motor cycle so as to protect the driver from the wind, but at the same time not forming a great amount of resistance nor hindering the driver from having full control of the motor cycle.

Another object of the invention is to generally improve upon devices of this class by the provision of a comparatively simple, strong, durable and inexpensive construction, and one which will be well adapted to the purpose for which it is designed.

With these and other objects in view, the invention consists of the novel features of construction, and the combination and arrangement of parts as will be hereinafter fully described and claimed.

In the accompanying drawings in which similar reference characters designate like parts throughout the several views:

Figure 1 is a perspective view of the framework of a windshield constructed in accordance with this invention, said view looking toward the rear of the framework.

Fig. 2 is a similar view of the front of the windshield with the cover in place.

Fig. 3 is a perspective view similar to Fig. 1—the cover being shown in plan.

In the drawings above briefly described the handle-bar of a motor cycle is shown and designated by the letter H. Fastened to the handle-bar H is a framework made up of a pair of bars 1 which are clamped at their lower ends around opposite sides of the handle-bar H as at 2 and which are twisted at 3 at points slightly above the clamping means 2 and then bent rearwardly as at 4 at an angle of about 45 degrees. From the rearwardly inclined portions 4, the bars are continued upwardly as at 5 and then have their upper ends 6 inclined rearwardly at an angle of 45 degrees.

Riveted or otherwise suitably secured to the upper ends of the portions 4 of the bars 1 are vertical bars 7 the lower ends of which are twisted as at 8 and then clamped around the sides of the handle-bar H at points spaced rearwardly of the points where the lower ends of the bars 1 are connected thereto. These bars 7 serve to brace the bars 1.

The numerals 10 represent longitudinally bowed diagonal brace bars which have their lower ends clamped as at 11 to the forwardmost and intermediate portion of the handle-bar H and which have their upper ends riveted or otherwise suitably secured to the rearwardly inclined portions 6 of the bars 1. These brace bars 10 prevent the bars 1 from being deflected rearwardly.

The framework of the windshield is completed by a pair of horizontal bars 12 and 13, which are riveted or otherwise suitably secured to the vertical portions 5 of the bars 1. The bar 12 is secured adjacent the upper ends of the vertical portions 5, while the bar 13 is secured adjacent the lower ends of the vertical portions 5. Both bars 12 and 13 have their ends projecting short distances beyond the bars 1.

Fastened in any suitable manner upon the framework is a fabric covering 14. This covering 14 is preferably stretched between the bars 1, 12 and 13 and has its sides curved rearwardly around the bars 1 and over the bars 7. The bars 10 are preferably disposed in front or outside of the covering 14 and the upper portions of the side edges of the latter are folded back upon themselves to serve as reinforcing means. The lower edge of the cover 14 is secured to the handle-bar H by suitable fastenings 15.

The covering 14 is provided in its front portion adjacent the opening defined by the bars 12 and 13 and the portions 5 of the bars 1 with a transparent panel 16.

With a windshield such as above described placed upon the handle-bar of a motor cycle the driver will be protected from the wind, but in view of the fact that the cover 14 is inclined rearwardly from its forward to its rear end, no great amount of resistance will be offered thereby. The transparent panel 16 permits the driver to see ahead, and the framework does not hinder him from having control of the motor cycle at all times.

Various changes in form, proportion and in the minor details of construction may be resorted to without departing from the invention as defined in the claims.

I claim as my invention:

1. A device of the class described comprising a framework adapted to be fastened to the handle-bar of a motor cycle and made up of a pair of side bars having upper and lower vertical portions offset with respect to each other, the extremities of the lower vertical portions of said side bars being provided with clamping means, vertical brace bars secured at their upper ends to said side bars adjacent the lower ends of the upper vertical portions thereof and provided at their lower ends with clamping means, diagonal brace bars secured at their upper ends to the extremities of upper vertical portions of said side bars and provided at their lower ends with clamping means, transverse bars connecting said side bars, and a fabric covering stretched over said frame.

2. A device of the class described comprising a framework adapted to be fastened to the handle-bar of a motor cycle and made up of a pair of side bars having offset upper and lower vertical portions connected by rearwardly inclined intermediate portions, the extremities of the lower vertical portions of said side bars being provided with clamping means, vertical brace bars secured at their upper ends to the upper ends of the inclined intermediate portions of said side bars and provided at their lower ends with clamping means, diagonal brace bars secured at their upper ends to the extremities of the upper vertical portions of said side bars and provided at their lower ends with clamping means, a pair of spaced horizontal bars extending between the upper vertical portions of said side bars and secured adjacent their ends thereto, and a fabric covering stretched over said frame.

3. A structure as specified in claim 2, and in addition thereto, portions of the side-edges of the fabric covering being doubled upon themselves to form reinforcing means, and a transparent panel in said covering.

In testimony whereof I have hereunto set my hand.

SAMUEL WHITNEY.